United States Patent [19]

King

[11] Patent Number: 5,009,839
[45] Date of Patent: Apr. 23, 1991

[54] NUCLEAR FUEL ASSEMBLY BOTTOM NOZZLE PLATE

[75] Inventor: Raymond A. King, Lynchburg, Va.

[73] Assignee: B&W Fuel Company, Lynchburg, Va.

[21] Appl. No.: 577,384

[22] Filed: Sep. 4, 1990

[51] Int. Cl.$^5$ .............. G21C 19/30; G21C 3/30; G21C 15/00
[52] U.S. Cl. ................... 376/352; 376/313; 376/443; 376/434; 376/446; 138/37; 138/44
[58] Field of Search ............... 376/352, 313, 443, 446; 138/37, 41, 44

[56] References Cited

U.S. PATENT DOCUMENTS

| | | | |
|---|---|---|---|
| 4,427,624 | 1/1984 | Marlatt et al. | 376/352 |
| 4,652,425 | 3/1987 | Ferrari et al. | 376/352 |
| 4,664,880 | 5/1987 | Bryan | 376/352 |
| 4,678,627 | 7/1987 | Rylatt | 376/313 |
| 4,781,884 | 11/1988 | Anthony | 376/352 |
| 4,828,791 | 5/1989 | DeMario | 376/352 |
| 4,900,507 | 2/1990 | Shallenberger et al. | 376/352 |

Primary Examiner—Brooks H. Hunt
Assistant Examiner—Frederick H. Voss
Attorney, Agent, or Firm—Robert J. Edwards; D. Neil LaHaye

[57] ABSTRACT

A bottom nozzle plate for a fuel assembly in a nuclear reactor. The bottom nozzle plate is formed from a rigid substantially square plate having legs adapted to be positioned on the lower core plate of the reactor for supporting the fuel assembly above coolant inlet openings in the core plate. The rigid square plate has two types of coolant flow holes therethrough. The first flow holes are grouped in clusters of four to define a square pattern relative to the sides of the plate such that the width of the sections of the plate between the flow holes in each cluster is less than the width of the sections of the plate between the clusters of four holes. Each of the second flow holes is formed in an irregular pattern to define a substantially clover leaf shape. The second flow holes are positioned so as to be above the coolant inlet openings in the core plate when the bottom nozzle plate is installed in the reactor.

4 Claims, 4 Drawing Sheets

NUCLEAR FUEL ASSEMBLY BOTTOM NOZZLE PLATE

BACKGROUND OF THE INVENTION

1. Field of the Invention

The present invention is generally related to a nuclear reactor fuel assembly and in particular to a bottom nozzle plate used with the fuel assembly.

2. General Background

Commercial nuclear reactors include multiple fuel assemblies. Each fuel assembly is comprised of a number of fuel rods radially spaced apart in a parallel array by grid assemblies spaced along the length of the fuel rods. Each grid assembly is formed in an eggcrate design by multiple metal strips that criss-cross at right angles to form individual cells for each of the fuel rods. The strips are provided with tabs that project into the cells against the fuel rods. The tabs serve the purpose of holding the fuel rods in their respective radial position. Control rod guide thimble tubes also extend through selected cells in the grid assembly and are attached at their upper and lower ends respectively to an upper end fitting and a lower end fitting. The upper and lower end fittings are also commonly referred to in the industry as nozzle plates since they are rigid plates that provide structural integrity and load bearing support to the fuel assembly and are provided with flow apertures therethrough for coolant flow. The lower end fitting or nozzle plate is positioned directly above openings in the lower portion of the reactor where coolant flows up into the reactor to the core. The ligaments between apertures in the end fittings coincide with the ends of the fuel rods and limit upward or downward movement of the fuel rods. Debris such as metal particles, chips, and turnings is generated during manufacture, installation, and repair of the reactor, piping, and associated cooling equipment. The size and complexities of the equipment prevent location and removal of all such debris before operations are commenced. Also, some of this debris may not become loose matter in the system until the system is put into operation. It has been recognized that this debris presents a greater problem to the system than previously thought. These small pieces of debris have been found to lodge between the walls of the grid cells and the fuel elements. Movement and vibration of the lodged debris caused by coolant flow results in abrasion and removal of cladding on the fuel rods. This in turn leads to detrimental effects such as corrosion of the fuel rods and failure to retain radioactive fission gas products. Such damage, although not critical to safety of the surrounding environment, can reduce operating efficiency by the need to suspend operation while replacing damaged fuel rods. It can be seen that a need exists for a debris filter capable of filtering debris of a size which may lodge between the grid cell walls and the fuel rods. An important consideration besides that of filtration is that a substantial coolant pressure drop across the filter must be avoided in order to maintain an adequate coolant flow over the fuel rods for heat removal therefrom. Patented approaches to this problem of which applicant is aware include the following.

U.S. Pat. Nos. 4,684,495 and 4,684,496 disclose debris traps formed from a plurality of straps aligned with one another in a crisscross arrangement and defining a plurality of interconnected wall portions which form a multiplicity of small cells each having open opposite ends and a central channel for coolant flow through the trap.

U.S. Pat. No. 4,828,791 discloses a debris resistant bottom nozzle which is a substantially solid plate having cut-out regions in alignment with inlet flow holes in the lower core plate. Separate criss-cross structures fixed to the plate extend across the cut-out regions to act as a debris trap.

U.S. Pat. Nos. 4,664,880 and 4,678,627 disclose debris traps mounted within a bottom nozzle that define a hollow enclosure with an opening so as to form a debris capturing and retaining chamber.

U.S. Pat. No. 4,652,425 discloses a trap for catching debris disposed between the bottom nozzle and the bottom grid. The structure forms multiple hollow cells that receive the fuel rod lower end plugs with dimples in each cell for catching debris carried into the cells by the coolant flow.

U.S. Pat. No. 4,900,507 discloses a nuclear fuel assembly debris filter bottom nozzle formed from a rigid plate having a plurality of flow holes. The holes are individually $0.190 \pm 0.008$ inch in diameter which is smaller than the predetermined maximum cross-sectional dimension of each of the unoccupied spaces through the lowermost grid. The sections of the plate extending between the flow holes have a maximum dimension of one-tenth inch.

Although a variety of approaches have been taken to the need for filtration of primary coolant, it is felt that the problem has not been adequately addressed. While certain designs such as those utilizing only small flow holes may provide adequate filtration of damaging debris, the problem of an unacceptable pressure drop may still exist.

SUMMARY OF THE INVENTION

The present assembly addresses the above need in a straightforward manner. What is provided is a nuclear fuel assembly bottom nozzle plate (lower end fitting) having two types of flow holes designed to prevent the passage of damage-inducing debris while minimizing pressure drop of coolant flow across the plate. The bottom nozzle plate serves to support the guide thimbles and fuel rods as well as acting as a filter. The bottom nozzle plate includes legs that support it on the lower core plate. A plurality of flow holes of the first type which are $0.180 \pm 0.005$ inch in diameter are provided across the plate in groups of four to form square clusters such that the width of the portions or ligaments of the plate between the holes in each cluster is less than the width of the ligaments of the plate between the square clusters. This spacing between square clusters corresponds with the spacing of the fuel rods in the fuel assembly such that the chamfered ends of fuel rods that are allowed to rest on the ligaments of the plate do not block the flow holes. The spacing of holes and number of wider ligaments between clusters is determined by the fuel array, such as a $17 \times 17$ or $15 \times 15$, that the nozzle plate is to be used with. The second type of flow holes are formed by providing an additional smaller aperture through the nozzle plate substantially at the center of some of the clusters of the first type of flow holes such that the four holes of the original cluster are all interconnected to form an irregular shaped flow hole. The second type of flow holes are positioned so as to be above the core plate holes that pass coolant flow to the nozzle plate when installed in the reactor.

BRIEF DESCRIPTION OF THE DRAWINGS

For a further understanding of the nature and objects of the present invention reference should be had to the following description taken in conjunction with the accompanying drawings in which like parts are given like reference numerals and, wherein.

DETAILED DESCRIPTION OF THE PREFERRED EMBODIMENT

Figure 1:
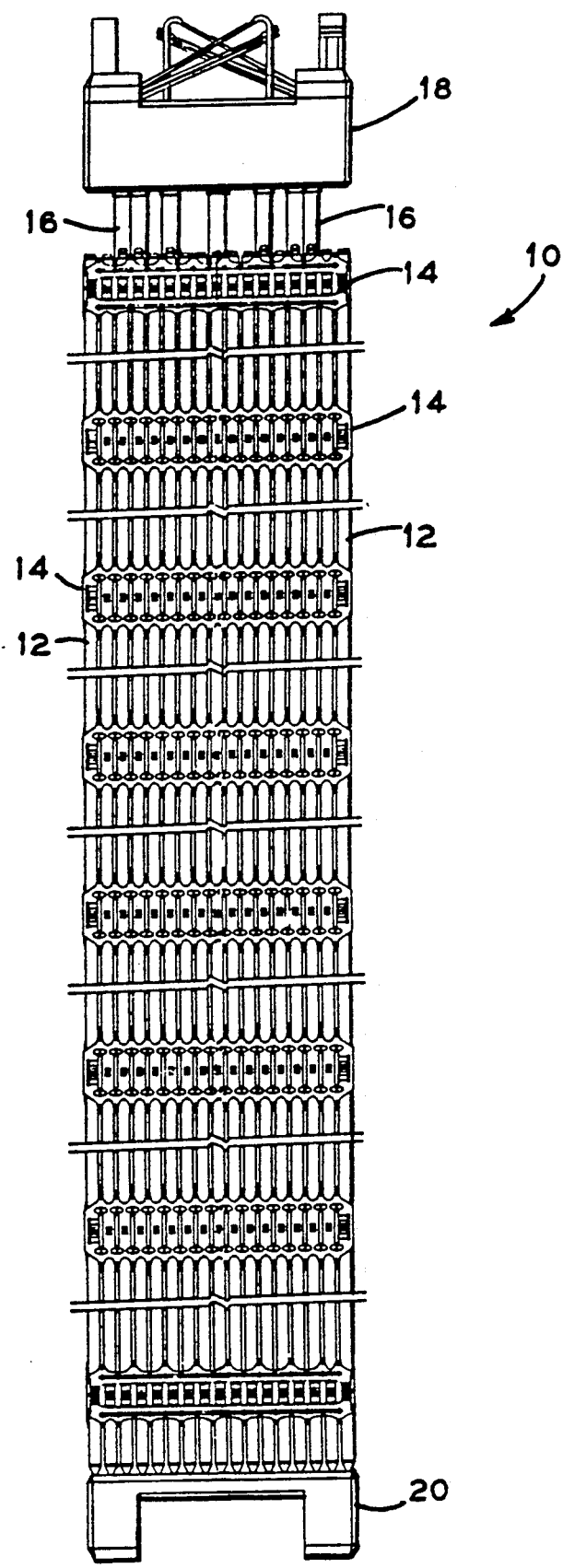
FIG. 1 is a partial sectional view of a typical fuel assembly.

Referring to the drawings, FIG. 1 is an illustration of a typical nuclear fuel assembly generally designated by the numeral 10. Fuel assembly 10 is typical of that used in a pressurized water reactor and is generally comprised of a plurality of fuel rods 12, grid assemblies 14, guide tubes 16, upper end fitting 18, and lower end fitting or bottom nozzle plate 20. Fuel rods 12 are maintained in an array spaced apart by grid assemblies 14. Guide tubes 16 extend through grid assemblies 14 and are attached to upper end fitting 18 and bottom nozzle plate 20 and, in addition to providing structural integrity to the entire assembly, also serve as guides for control rods not shown. Upper end fitting 18 and bottom nozzle plate 20 provide structural and load bearing support to fuel assembly 10 and are also provided with openings therethrough to allow coolant to flow vertically through fuel assembly 10. Bottom nozzle plate 20 rests on the lower core support plate (not shown) of the reactor and directly above coolant inlet openings 22 (shown in phantom view in FIG. 3) in the core support plate that direct coolant upward to the fuel assembly. Dimples or tabs in the walls of the grid assemblies 14 radially position the fuel rods to allow maximum surface area contact of fuel rods 12 with the coolant as it flows upwardly therethrough.

Figure 2:
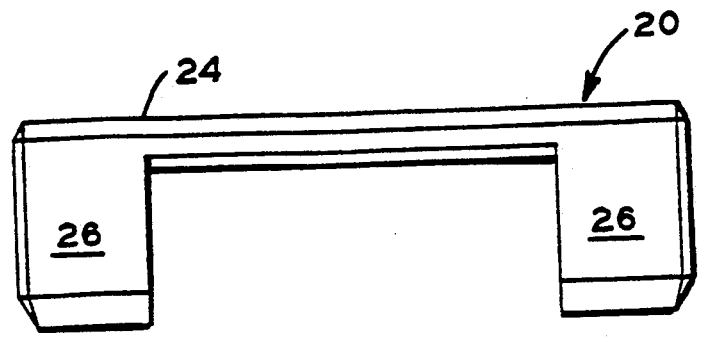
FIG. 2 is a side view of the invention.
Figure 3:
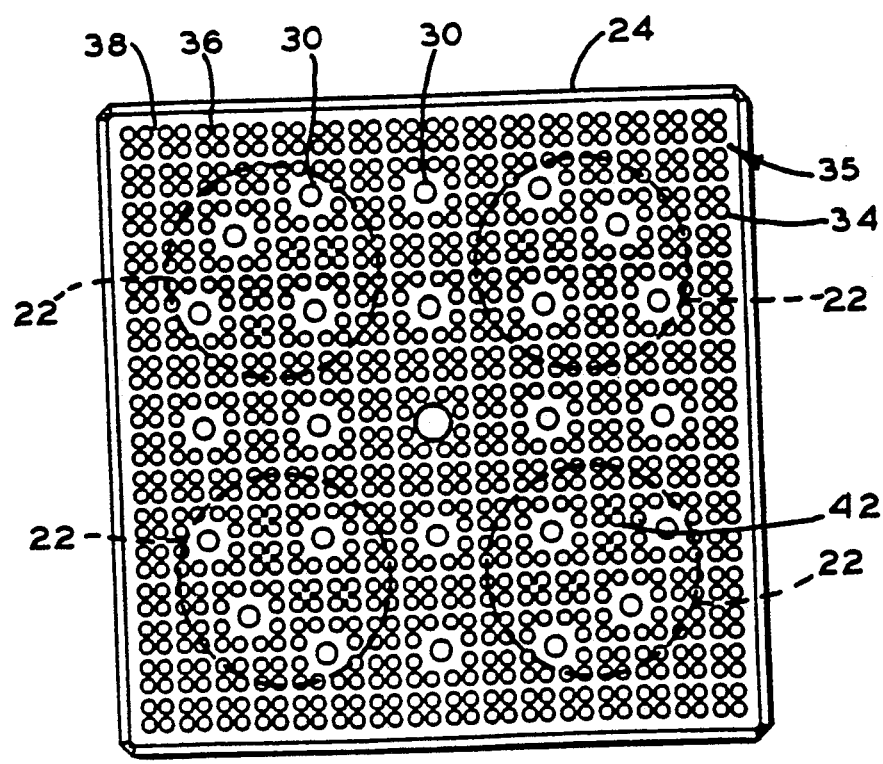
FIG. 3 is a top view of the invention.
Figure 4:
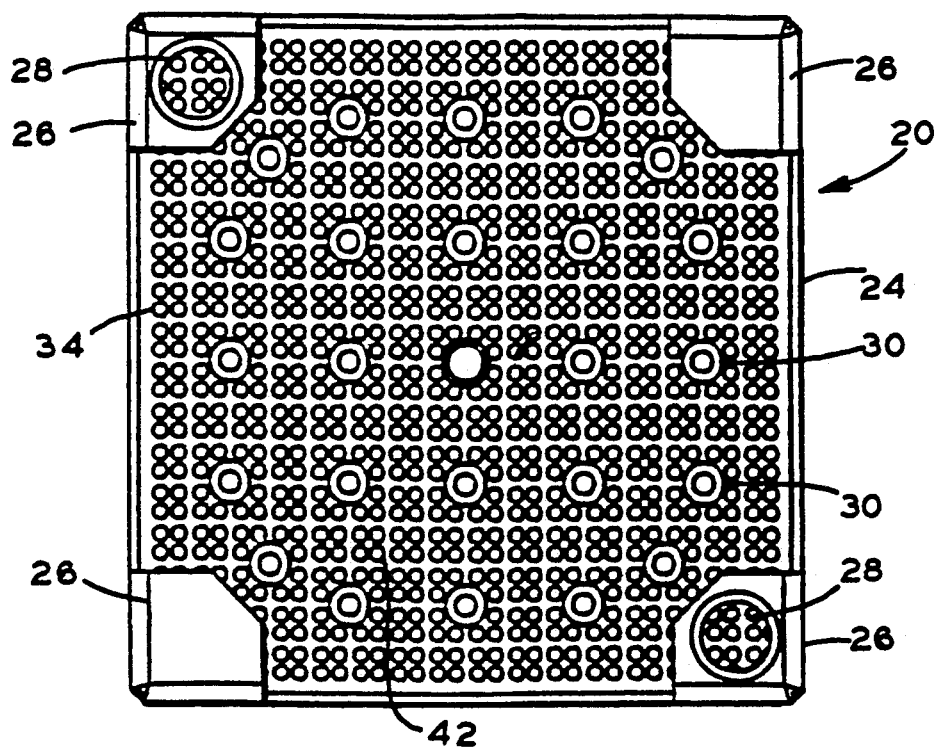
FIG. 4 is a bottom view of the invention.

Bottom nozzle plate 20, seen in FIG. 2–4, is formed from a rigid substantially square plate 24. Legs 26 may be separate parts attached to plate 24 by any suitable means such as welding or may be integral therewith. Openings 28 provided on two diagonally disposed legs 26 are used to position the bottom nozzle plate 20 with the lower core plate to prevent movement of bottom nozzle plate 20 and fuel assembly 10 during reactor operations. Bottom nozzle plate 20 is provided with two types of holes that do not pass coolant flow therethrough. A plurality of guide thimble tube holes 30 are provided and spaced across the plate in a pattern corresponding to the guide thimble tubes of the fuel assembly. The threaded ends of guide thimble tubes 16 extend through guide thimble tube holes 30 and receive threaded nuts so that the guide thimble tubes are attached to bottom nozzle plate 20. Instrumentation tube hole 32 is substantially at the center of bottom nozzle plate 20 and receives an instrumentation tube used to monitor core conditions during reactor operations.

Figure 7:
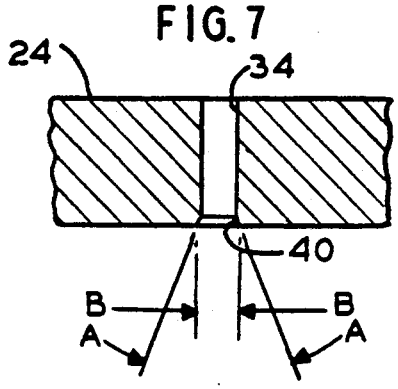
FIG. 7 is an enlarged cross sectional view of one of the first types of flow holes of the invention.
Figure 8:
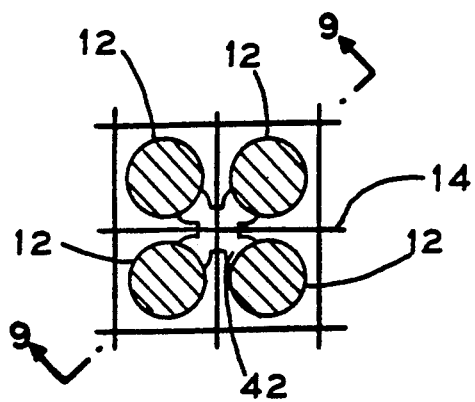
FIG. 8 is a top view illustrating the relative positioning of fuel rods and the second flow hole.
Figure 9:
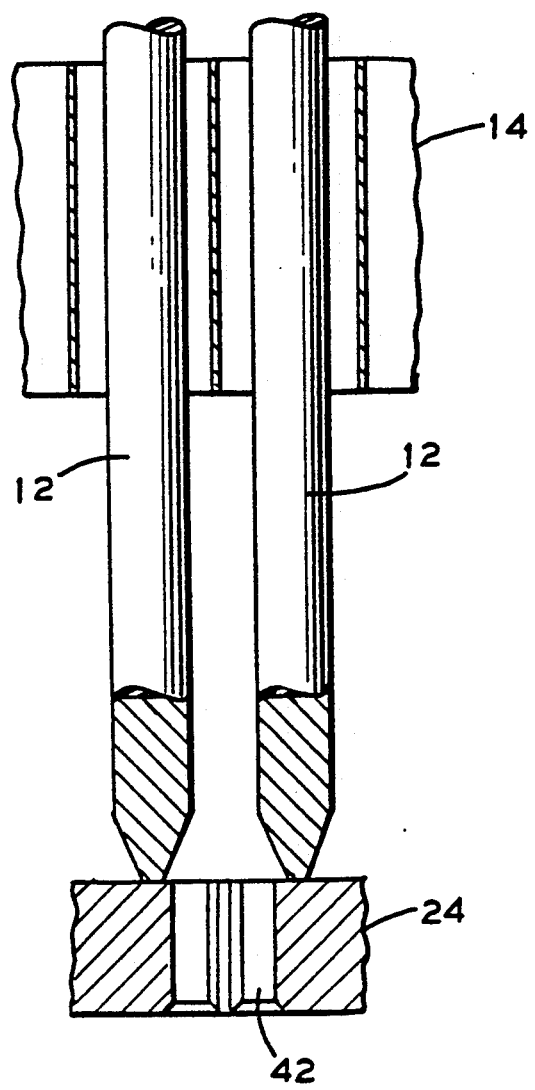
FIG. 9 is a view taken along the lines 9—9 of FIG. 8.

Two types of coolant flow holes are provided through bottom nozzle plate 20 for passing coolant received from coolant inlet openings 22 in the core plate and for filtering debris of a size known to cause damage to fuel rods 12. A plurality of first flow holes 34 are provided through nozzle plate 20 where each first flow hole 34 is circular in cross section and 0.180±0.005 inch in diameter. As seen in FIG. 3 and 4, the majority of first flow holes 34 are grouped in clusters of four holes arranged to define a square pattern 35 relative to the sides of nozzle plate 20. This provides an arrangement of flow holes where the width of the sections or ligaments of the plate between flow holes within the cluster is less than the width of the ligaments of the plate between the clusters. The narrower ligaments within the clusters are indicated by the numeral 36 while the wider ligaments between clusters are indicated by the numeral 38. In the preferred embodiment, the spacing of flow holes 34 to define square clusters 35 is determined by the number of fuel rods 12 in the fuel assembly above bottom nozzle plate 20. For example, in a 17×17 array such as that illustrated, the number of square clusters is arranged so as to provide 15 wider ligaments 38 across bottom nozzle plate 20 in addition to the boundary ligaments. In this manner, the end of fuel rod 12 contacts bottom nozzle plate 20 at wider ligament 38. This provides stable support to the fuel rod and more importantly does not result in any of the flow holes being blocked by the fuel rod which would cause a pressure drop and reduction of coolant flow. On a projected basis fuel rods 12 do overlap the holes, however the rods are chamfered at the lower end to prevent direct blockage. This is best seen in FIG. 8 and 9. As seen in the cross sectional view of FIG. 7, each of first flow holes 34 is provided with a chamfered lower edge 40. As indicated by the letter A, the angle of chamfered lower edge 40 is 45 degrees plus or minus 2 degrees. This provides a diameter of 0.216±0.008 inch (as indicated by the letter B) at lower edge 40 in the preferred embodiment. The chamfer decreases the hydraulic resistance of coolant flow through the flow holes and thus reduces the pressure drop of coolant flow. As seen in the drawings, the presence of guide thimble tube holes 30 and instrumentation tube hole 32 prevent all of first flow holes 34 from being arranged in groups of four. In order to maintain structural integrity of bottom nozzle plate 20 around holes 30 and 32, it is necessary to eliminate one of first holes 34 in each group around holes 30 and 32 to prevent overlap of holes.

Figure 5:
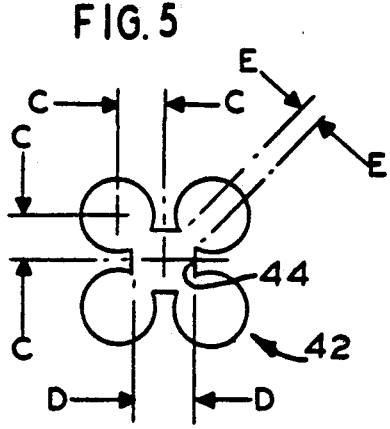
FIG. 5 is an enlarged view of the second type of flow hole used in the invention.

A plurality of a second type of flow holes 42 are preferably positioned so as to be above the coolant inlet openings 22 in the core plate when bottom nozzle plate 20 is in its installed position. As best seen in FIG. 5, each of second flow holes 42 is an irregular shaped hole that may be described as a modification of the four first flow holes 34 in square pattern 35 to define a substantially clover leaf shape in top or bottom view. The modification to obtain second flow hole 42 comprises interconecting the four flow holes in the square pattern. This is accomplished by removing a section of bottom nozzle plate 20 that is centrally located between the four flow holes such that an equal amount of each flow hole in the pattern is included by the removed section. In the preferred embodiment, central portion 44 of each second flow hole 42 defines a square having its corners intersect the four flow holes of the square pattern. As indicated by the letter C in FIG. 5, the extended distance along a plane from the center of central portion 44 to the center of each of the four holes originally forming the square pattern is 0.1125 inch in the preferred embodiment. As indicated by the letter D, the width of central portion 44 is 0.117 inch. As indicated by the letter E, each corner of central portion 44 intersects a width of 0.025±0.015 inch of each of the four flow holes originally forming the square pattern. The channel width E of 0.025 inch is chosen to be less than the nominal spacing of 0.041 inch between bottom nozzle plates in the reactor core. This insures that the most open passage for debris to enter the fuel rod region is not through the flow holes that lead directly to the spaces between the fuel rods and grid assemblies that are more likely to trap damaging debris. In the preferred embodiment, second flow holes 42 are located on bottom nozzle plate 20 so as to be evenly distributed over all coolant inlet openings 22 in the core plate. For a 17×17 array such as that illustrated, there are a total of sixteen second flow holes 42, four above each coolant inlet opening 22 in the core plate. This provides a flow area of 8.47 square inches above coolant inlet openings 22 in the core plate.

In addition to minimizing pressure drop of coolant flow, the number and positioning of second flow holes 42 are also selected so as not to have a detrimental effect on the structural integrity of bottom nozzle plate 20. The structural loads that act on bottom nozzle plate 20 during operations are transmitted through the guide thimble tubes and fuel rods 12 and are reacted out at legs 26. Due to the large number of load points (24 guide thimble tubes and 264 fuel rods in a 17×17 array), bottom nozzle plate 20 behaves as a uniformly loaded plate fixed at the corners. Under these loading conditions the maximum stresses occur near the center of the plate and near the fixed boundary. Second flow holes 42 are located midway between these areas in a generally low stressed area of nozzle plate 20.

Figure 6:
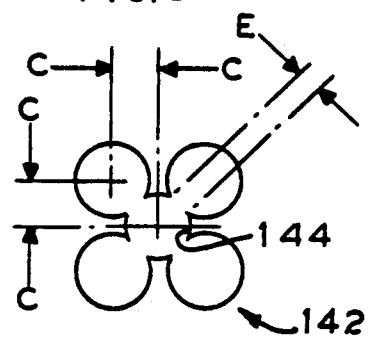
FIG. 6 is an enlarged view of an alternate embodiment of the second type of flow hole used in the invention.

An alternate embodiment of second flow hole 42 is illustrated in FIG. 6 and indicated by the numeral 142. Central portion 144 is circular instead of square and is 0.142 inch in diameter. This provides a flow area of 8.52 square inches above coolant inlet openings 22 in the core plate. Dimensions C and E are the same as for second flow hole 42.

In operation, bottom nozzle plate 20 supports fuel assembly 10 by means of guide thimble tubes 16 attached through guide thimble tube holes 30. Bottom nozzle plate 20 is positioned on the core plate by dowels extending through openings 28 in legs 26. First and second flow holes 34,42 are sized and spaced apart so as to filter damage inducing debris from the coolant while minimizing the pressure drop of coolant flow. For a 17×17 array fuel assembly, square plate 24 measures 8.425 inch along each side and is 0.637 inch thick. The thickness of the plate is required to maintain structural integrity as it supports the fuel assembly and is subject to the pressures of coolant flow. The spacing of flow holes in square clusters 35 provides ligaments 38 between square clusters that are 0.090 inch and ligaments 36 between holes in the square clusters that are 0.045 inch. After allowing sufficient space for guide thimble tube holes 30 and instrumentation tube hole 32, this provides eight-hundred sixty first flow holes 34 and sixteen second flow holes 42 for a total of eight-hundred seventy-six flow holes. For the standard square plate used in a 17×17 array as mentioned above, this provides a flow hole density of approximately 12.34 holes per square inch. Naturally, the number of flow holes will vary in direct proportion to the size of the bottom nozzle plate used with the flow hole size and spacing taught herein.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a fuel assembly for a nuclear reactor, a bottom nozzle plate having legs adapted to be positioned on the lower core plate of the reactor for supporting the fuel assembly above coolant inlet openings in the core plate, said bottom nozzle plate comprising:
   a. a rigid substantially square plate; and
   b. said square plate having a plurality of first coolant flow holes therethrough where each of said first flow holes is circular in cross section and 0.180±0.005 inch in diameter with the majority of said first flow holes grouped in clusters of four to define a square pattern relative to the sides of said square plate such that the width of the sections of said square plate between said first flow holes in said square pattern is less than the width of the sections of said square plate between said clusters of four holes and said square plate having a plurality of second coolant flow holes therethrough positioned so as to be above the coolant inlet openings in the core plate when said bottom nozzle plate is installed in the reactor, with each of said second flow holes being of an irregular pattern to define a substantially clover leaf shape.

2. The bottom nozzle plate of claim 1, wherein each of said first flow holes has an inlet chamfer of 45 degrees plus or minus 2 degrees.

3. The bottom nozzle plate of claim 1, wherein the width of the sections of said square plate between said first flow holes in said square pattern is approximately 0.045 inch and the width of the sections of said square plate between said clusters of four holes is approximately 0.090 inch.

4. In a fuel assembly for a nuclear reactor, a bottom nozzle plate having legs adapted to be positioned on the lower core plate of the reactor for supporting the fuel assembly above coolant inlet openings in the core plate, said bottom nozzle plate comprising:
   a. a rigid substantially square plate; and
   b. said square plate having a plurality of first coolant flow holes therethrough Where each of said first flow holes is circular in cross section, has an inlet chamfer of 45 degrees plus or minus 2 degrees, and is 0.180±0.005 inch in diameter with the majority of said first flow holes grouped in clusters of four to define a square pattern relative to the sides of said square plate such that the width of the sections of said square plate between said first flow holes in said square pattern is approximately 0.045 inch and the width of the sections of said square plate between said clusters of four holes is approximately 0.090 inch and said square plate having a plurality of second coolant flow holes therethrough positioned so as to be above the coolant inlet openings in the core plate when said bottom nozzle plate is installed in the reactor, with each of said second flow holes being of an irregular pattern to define a substantially clover leaf shape.

* * * * *